United States Patent
Dieter et al.

(10) Patent No.: US 6,549,291 B1
(45) Date of Patent: Apr. 15, 2003

(54) PROCESS FOR CONTINUOUS DETERMINATION OF THE OPTICAL LAYER THICKNESS OF COATINGS

(75) Inventors: Torsten Dieter, Bad Soden/Salmunster (DE); Rudolf Beckman, Hanau (DE); Alfons Zoller, Bad Soden/Salmunster (DE); Harro Hagedorn, Frankfurt (DE)

(73) Assignee: Balzers Leybold Optics GmbH, Hanau (DE)

( * ) Notice: Subject to any disclaimer, the term of this patent is extended or adjusted under 35 U.S.C. 154(b) by 0 days.

(21) Appl. No.: 09/655,222

(22) Filed: Sep. 5, 2000

(51) Int. Cl.⁷ .............................................. G01B 11/06
(52) U.S. Cl. .......................... 356/630; 356/632; 427/10
(58) Field of Search ........................ 356/630, 631, 356/632, 239.1, 239.4; 250/559.27; 427/8, 9, 10; 204/298.03, 192.13

(56) References Cited

U.S. PATENT DOCUMENTS

| | | | |
|---|---|---|---|
| 3,807,870 A | * 4/1974 | Kalman | |
| 3,994,586 A | * 11/1976 | Sharkins et al. | |
| 4,320,967 A | 3/1982 | Edgar | |
| 4,832,490 A | 5/1989 | Boos et al. | 356/325 |
| 5,208,645 A | * 5/1993 | Inoue et al. | 356/73.1 |
| 5,282,217 A | * 1/1994 | Yamazaki | 372/31 |
| 5,289,265 A | * 2/1994 | Inoue et al. | 356/382 |
| 5,289,266 A | 2/1994 | Shih et al. | |
| 5,355,083 A | * 10/1994 | George et al. | 356/381 |
| 5,416,574 A | 5/1995 | Fantone | |
| 5,564,830 A | * 10/1996 | Bobel et al. | 356/381 |
| 5,657,124 A | * 8/1997 | Zhang et al. | 356/355 |
| 5,696,583 A | * 12/1997 | Yoon | 356/381 |
| 5,772,861 A | * 6/1998 | Meredith, Jr. et al. | 427/9 |
| 5,841,138 A | * 11/1998 | Prekel et al. | 356/381 |
| 6,055,058 A | * 4/2000 | Kahbichler et al. | 356/381 |
| 6,128,087 A | * 10/2000 | Meredith, Jr. et al. | 356/381 |

FOREIGN PATENT DOCUMENTS

| | | |
|---|---|---|
| DE | 198 14 056 | 11/1999 |
| EP | 0011723 | 10/1979 |
| FR | 2 589 578 | 7/1987 |

OTHER PUBLICATIONS

"Measurements of Optical Constants of Thin Films", O.S. Heavens, *Phys. Thin Films*, 2 (1964) S. 193–238.

"Optical monitoring comparison of different monitoring strategies with respect to the resulting reproducibility to the completed layer systems", A. Zöller, R. Herrmann, W. Klug and W. Zültzke, *Thin Film Technologies II*, (1985) SPIE vol. 552, 21–26.

* cited by examiner

*Primary Examiner*—Hoa Q. Pham
(74) *Attorney, Agent, or Firm*—Needle & Rosenberg, P.C.

(57) ABSTRACT

Process for continuous determination of the optical layer thickness of coatings, which are applied on both sides of the spherical surfaces of concave convex lenses having different spherical radii $R_1$ and $R_2$. In this process a ray of light is beamed eccentrically during the coating process at each concave convex lens, and the reflection or transmission at the convex spherical surface and at the concave spherical surface is continuously measured with photodiodes, and the respective optical layer thickness is determined from the functional relationship between the reflection or the transmission and the optical layer thickness.

13 Claims, 3 Drawing Sheets

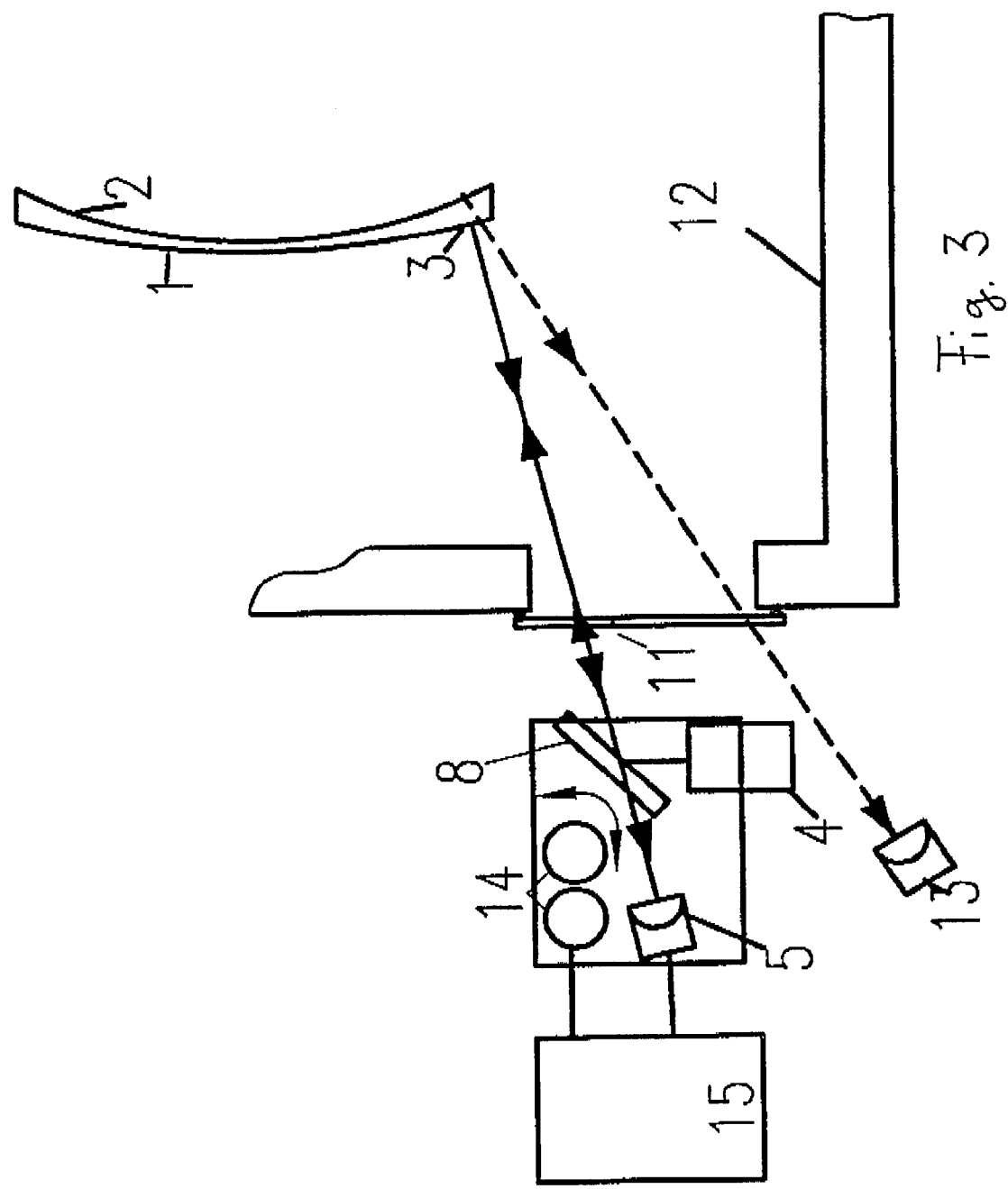

PROCESS FOR CONTINUOUS DETERMINATION OF THE OPTICAL LAYER THICKNESS OF COATINGS

FIELD OF THE INVENTION

The invention relates to a process for continuous determination of the optical layer thickness of coatings, which are applied on both sides of the spherical surfaces of concave convex lenses having different spherical radii $R_1$ and $R_2$.

DESCRIPTION OF THE RELATED ART

There exist photographic methods for measuring the thickness of layers deposited by means of vapor on glass panes or the like. The DE-OS 36 27 232 describes a photometer, wherein a chopper produces a measurement phase, a reference phase and a dark phase, with the result that these different phases are offset in time so that there can be a single detector for all of the phases. There is also a first and a second light guide, between whose one respective end there is arranged the object to be measured. Furthermore, there is a third light guide, whose one end is located opposite the detector and whose other end is connected to a chopper, which is also connected to the other end of the first light guide. At the same time there is the drawback that there must be several light sources.

In J. Roland Jacobsson: PROCEEDINGS, volume 652, Thin Film Technologies II, 1986, page 24, the functional relationships between the reflection and the optical layer thickness are described. The studies discuss, among other things, layer systems that are constructed by applying several alternate layers of $TiO_2$ and $MgF_2$ on a substrate. These functional relationships can be calculated theoretically for different layer materials in accordance with the universal law of optics on regularity.

SUMMARY OF THE INVENTION

The invention is based on the problem of providing a process for continuous determination of the optical layer thickness of coatings, which are applied on both sides of concave convex lenses. Furthermore, this process is relatively simple to carry out, with the result that there is no need for standard measurements at standard substrates. The process ought to be advantageous to carry out even if the concave convex lenses exhibit layer systems comprising several different layers.

The problem, on which the invention is based, is solved with a process for continuous determination of the optical layer thickness of coatings, which are applied on both sides of the spherical surfaces of concave convex lenses with different spherical radii $R_1$ and $R_2$. In this inventive process a ray of light is beamed eccentrically during the coating process at each concave convex lens, and the reflection or transmission at the convex spherical surface and at the concave spherical surface is continuously measured with photodiodes, and the respective optical layer thickness is determined from the functional relationship between the reflection or the transmission and the optical layer thickness. The optical layer thickness is defiried as the product of the geometric layer thickness and the respective index of refraction, based on the selected wavelength. Uni-layered or multi-layered layer systems can be used as the coating. In the process a light ray is used that exhibits a width ranging from 0.1 mm to 5 mm. The functional relationship between the reflection or the transmission and the respective optical layer thickness is well known or can be calculated beforehand so that the optical layer thickness can be determined from the calculated values of the reflection or the transmission. It has been demonstrated surprisingly that the optical layer thickness on both sides of the concave convex lens can be determined and monitored continuously during the coating process. Since only one light source is required, it is advantageous that there is no need for standard measurements at standard substrates. This feature is especially advantageous when the convex spherical surface and the concave spherical surface are provided with different layers having different layer thicknesses as the layer systems, and both sides are coated simultaneously.

A preferred embodiment of the invention comprises that a light ray is beamed at the peripheral area of the concave convex lens. The peripheral area is defined as that outer area that extends in a width ranging from 1 to 12 mm from the outer edge of the concave convex lens to its center. In this manner the reflection can be determined in an especially advantageous manner, since the difference between the angle of reflection at the convex spherical surface and the angle of reflection at the concave spherical surface is larger in the peripheral area of the concave convex lens than in the immediate vicinity of the center of the concave convex lens. In this manner the reflection at both spherical surfaces of the concave convex lens can be determined separately by means of two separate photodiodes. The immediate result is the optical layer thickness on both spherical surfaces. If, in contrast, the ray of light is beamed precisely at the center of the concave convex lens, a feature that is not provided in accordance with the invention, then the reflections at both spherical surfaces of the concave convex lens have the same direction. Hence a separate determination of the reflection could be done only with difficulty. However, the latter is an absolute prerequisite for successfully monitoring the coating process. Thus, there is the advantageous possibility of determining separately the reflection, when a ray of light is beamed unilaterally at the peripheral area of a concave convex lens and when the radii of curvature of both spherical surfaces are different.

According to another preferred embodiment of the invention, the ray of light is split with a chopper or guided through a narrow band filter prior to reaching the photodiodes. A chopper disk can be used, for example, as the chopper. This feature enables an advantageous continuously pulsed impingement of the light beam on the concave convex lens, a feature that makes it easier to evaluate the measurement results, insofar as the coating process provides an intense, intermittent background glow, which the photodiode detects as a far greater disturbing factor than the reflection of the ray of light. The background glow usually has a negative effect on an accurate evaluation of the measurement results, insofar as the ray of light is guided unsplit to the concave convex lens. Thus the negative effects of the background glow can be avoided.

Another preferred embodiment of the invention provides that the ray of light is guided through a beam splitter prior to impinging on the concave convex lens, and the intensity of one part of the ray of light is determined with another photodiode. Thus it is possible to monitor any fluctuations, which could falsify the measurement results, when the light is being emitted from the light source.

Another embodiment of the invention provides that the ray of light is guided through a deflecting mirror that is used as a beam splitter. With the use of the deflecting mirror the ray of light can be split especially advantageously into its desired intensity.

According to another preferred embodiment of the invention, white light is used as the ray of light. White light contains in the visible range all of the wavelengths in the range from 390 nm to 770 nm. At the same time it is advantageous that one can adjust the measurement of the reflection or transmission to specific wavelengths, which owing to the method of measurement are especially advantageous to measure.

Another preferred embodiment of the invention comprises that the ray of light is guided perpendicularly onto the convex spherical surface. In this manner the reflection is especially easy to determine, especially when there is, for example, only one small vacuum chamber as the coating chamber, and the angles of reflection can be found only with difficulty for spatial reasons. This is the case especially with coating systems, where only a small number of concave convex lenses can be coated simultaneously.

Another embodiment of the invention comprises that a ray of light having a diameter ranging from 0.1 mm to 2 mm is used. In this range the measurements of the reflection or the transmission can be conducted almost without errors.

According to another preferred embodiment of the invention, eyeglass lenses are used as the concave convex lenses. The eyeglass lenses can be made of glass or plastic. Since in the coating process of eyeglass lenses the respective layer thickness of the coatings has to be set very precisely, eyeglass lenses constitute especially advantageous concave convex lenses for the proposed process.

Another preferred embodiment of the invention provides that the ray of light is guided via an adjustable mirror to a photodiode. With the use of adjustable mirrors it is easy to position the photodiodes for the purpose of beaming the ray of light at said diodes, a feature that increases the quality of the measurement results.

Another preferred embodiment of the invention comprises that the reflection or the transmission at the convex spherical surface or at the concave spherical surface is measured continuously with position sensitive detectors that are provided as the photodiodes. The use of position sensitive detectors as the photodiodes also increases the measurement accuracy of the process in an advantageous manner.

In another preferred embodiment of the invention the change in direction of the ray of light, reflected at the convex spherical surface, is measured continuously and compensated for with a control system. Owing to the thermal effects on the concave convex lenses to be treated in the coating chamber, it is possible that the radii of curvature of the convex spherical surface or the concave spherical surface can be slightly altered. The consequence is that there is simultaneously a change in the direction of the respective reflected ray of light, which can have a negative effect on the measurement of the reflection or the transmission. Therefore, it is advantageous to monitor continuously this change in direction, which can be done with a simple control circuit. Then any discrepancies in the change in direction can be corrected immediately. At the same time a measurement and control apparatus can be used that is connected directly to an adjusting unit. This feature increases the accuracy of the process for determining continuously the optical layer thickness.

Another preferred embodiment of the invention comprises that the ray of light is emitted from a laser diode that is provided as the light source. In this manner the cost of components can be saved. Thus, for example, there is no need to provide a chopper. Moreover, the arrangement of the laser diodes requires very little space, a feature that is also advantageous.

The invention is explained in detail and as an example in the following with reference to the drawings (FIG. 1 to FIG. 3).

BRIEF DESCRIPTION OF THE DRAWINGS

FIG. 3 shows a cross sectional view of a vacuum chamber with a concave convex lens arranged therein and a light source, which is positioned outside the vacuum chamber and which is integrated into a component.

DETAILED DESCRIPTION OF THE PREFERRED EMBODIMENTS

Figure 1:
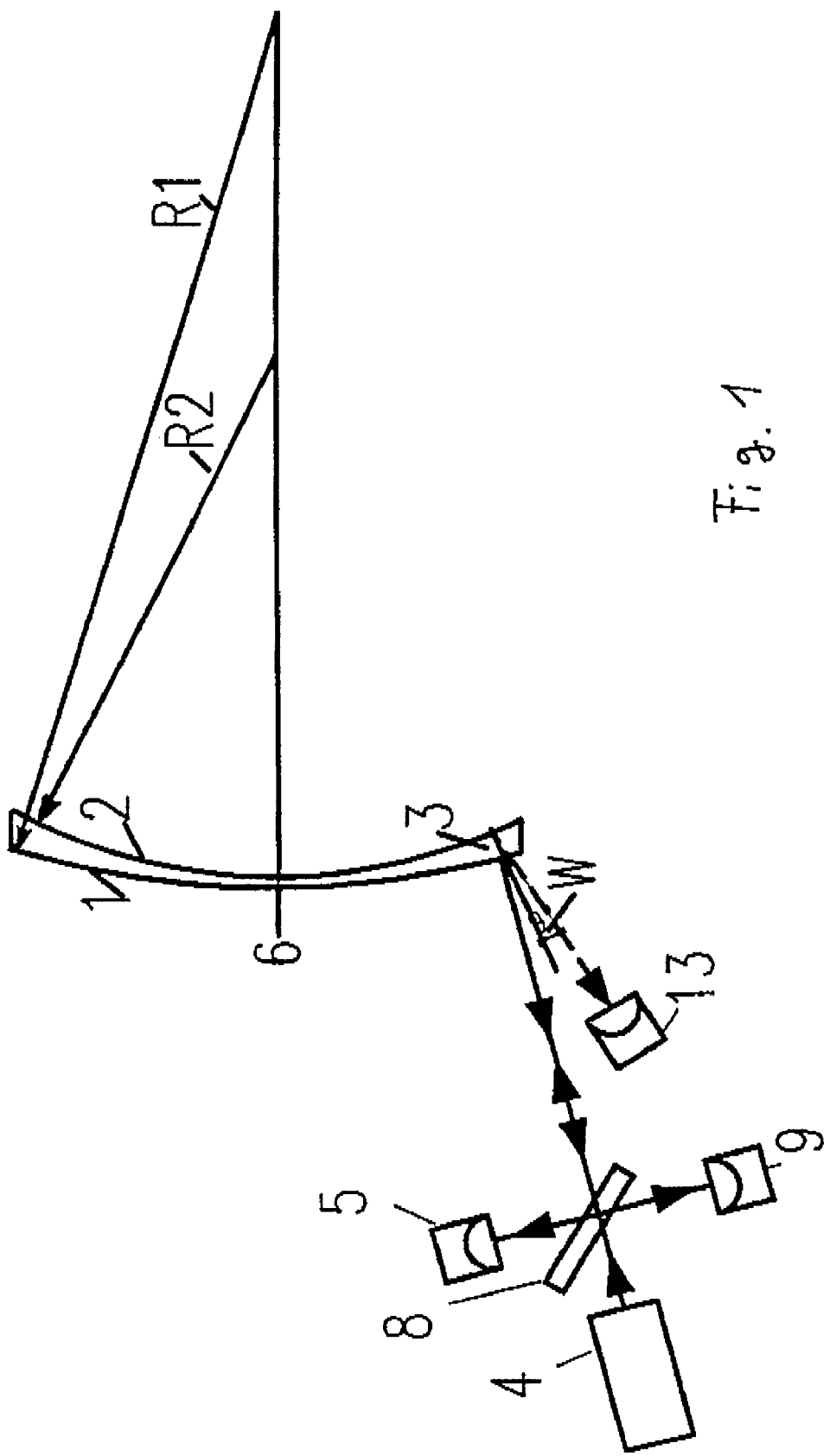
FIG. 1 shows a cross sectional view of a concave convex lens with the convex spherical surface and the concave spherical surface.

FIG. 1 is a simplified schematic drawing of a concave convex lens, where shading is omitted for the sake of a better overview. The concave convex lens exhibits a convex spherical surface 1 having a spherical radius $R_1$. On the opposite side, the concave convex lens is defined by a concave spherical surface 2 having a spherical radius $R_2$. In the process for determining continuously the optical layer thickness of coatings, which are applied on both sides of the spherical surfaces of concave convex lenses having different spherical radii $R_1$ and $R_2$, a ray of light, starting from a light source 4 and passing through a beam splitter 8, is beamed during the coating process, at a measurement point 3 of the concave convex lens. Said measurement point does not coincide with the center 6 of the concave convex lens and is selected by an especially advantageous method in the peripheral area of the concave convex lens. The beam splitter 8 divides the ray of light into two parts. The first part of the ray of light is guided to the other photodiode 9, which serves to monitor the light source 4. The second part of the ray of light strikes perpendicularly the measurement point 3 lying in the peripheral area of the concave convex lens and is then reflected at the convex spherical surface 1, wherein the reflected ray of light does not experience any change in direction. The ray of light, passing through at the convex spherical surface 1, arrives at the concave spherical surface 2 and is reflected there, whereby the reflected ray of light (shown with a dashed line) experiences a change in direction in accordance with the angle of reflection W. The ray of light, reflected at the concave spherical surface 2, is guided to the photodiode 13. The ray of light, reflected at the convex spherical surface 1, is guided to the photodiode 5. Values for the respective optical layer thicknesses on the spherical surfaces can be assigned directly to the measured values of the reflection or the transmission at the convex spherical surface 1 and concave spherical surface 2. In so doing, one can resort to the known functional relationships. In this manner the optical layer thicknesses can be determined continuously during the coating process on the convex spherical surface 1 and the concave spherical surface 2 so that the actual coating process can be monitored and also optimized in a relatively easy manner. The reflected rays of light can also be guided through light filters prior to reaching the photodiodes 5, 13 or can be intensified phase selectively (not illustrated).

Figure 2:
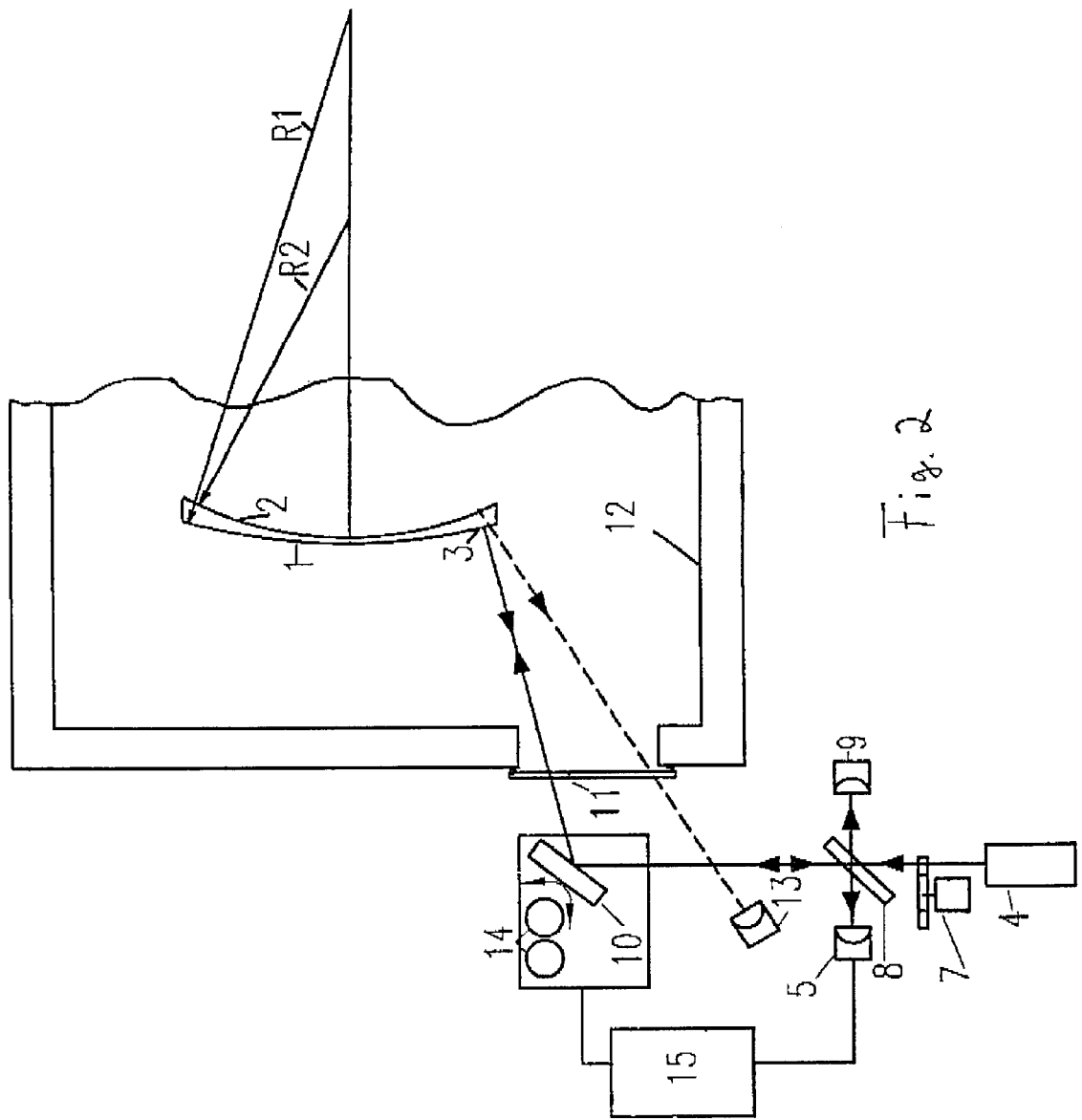
FIG. 2 shows a cross sectional view of a vacuum chamber with a concave convex lens arranged therein and a light source positioned outside the vacuum chamber.

FIG. 2 is a cross sectional view of a vacuum chamber 12, where a concave convex lens is provided. The two-sided coating process of the concave convex lens takes place in the vacuum chamber 12. Outside the vacuum chamber 12 there is a light, source 4. Starting from the light source 4, the ray of light is guided to a chopper 7, which is provided as a chopper disk. Then the chopped ray of light passes to a beam splitter 8, which divides the ray of light into two parts. The first part of the ray of light is guided to the other photodiode 9, which serves to monitor the light source 4, which can be subjected to occasional fluctuations in intensity of the emitted ray of light. The second part of the ray of light passes via a deflecting mirror 10 and an inspection glass 11 into the vacuum chamber 12 and then impinges on the measurement point 3, lying in the peripheral area of the concave convex lens, on the convex spherical surface 1. The ray of light, reflected at the convex spherical surface 1, passes via the inspection glass 11 and the deflecting mirror 10 and via the beam splitter 8 directly to the photodiode 5, which serves to determine the reflection. The values, measured in the photodiode 5, are then assigned to the optical layer thicknesses in accordance with known functional relationships. In this manner the reflection of the ray of light (shown as a dashed line) reflected at the concave spherical surface 2 is determined, whereby this reflected ray of light is guided to the photodiode 13. Owing to the process fluctuations, it can happen that the ray of light that is reflected at the convex spherical surface 1 changes direction during the operation so that it is advantageous to measure this change in direction continuously and to compensate for it with a control system 14, 15. The photodiode 5 monitors the point at which the reflected ray of light impinges. The measured values are fed to the measurement and control apparatus 15. If there is a change in direction, a suitable signal is sent from the measurement and control apparatus to the adjusting unit 14, which automatically changes the position of the deflecting mirror 10 in such a manner that the change in direction is compensated for. This can be done with the aid of a single control circuit. The deflecting mirror 10 and the adjusting unit 14 can be provided in a uniform component, which is indicated by the rectangle surrounding both parts in FIG. 2. A position sensitive detector can be provided as the photodiode 5 in an advantageous manner. The position sensitive photodiode is defined as an optical component, which serves, like a photodiode, to measure the light intensity and can simultaneously measure the position of the ray of light on the photosensitive surface. Compensating for the change in direction guarantees in an advantageous manner that the entire portion of the reflected ray of light is also, in fact, measured by the photodiode 5. Generally the ray of light is oriented prior to the actual coating phase in the vacuum chamber 12. In this manner the coating process for coating concave convex lenses can be monitored or optimized in a relatively inaccessible vacuum chamber 12. Eyeglass lenses can be used in an advantageous manner as the concave convex lenses.

FIG. 3 is a cross sectional view of a vacuum chamber 12 with a concave convex lens arranged therein and a light source 4, which is positioned outside the vacuum chamber 12 and which is integrated into one component. The light source 4 is designed as a laser diode. Since the laser diode is usually subjected only to slight fluctuations in the intensity of the emitted ray of light, there is no need to provide here a chopper and a deflecting mirror. The photodiode 5, provided for measuring the reflection of the ray of light reflected at the convex spherical surface 1, is combined together with the light source 4, the adjusting unit 14 and the beam splitter 8 into one structural unit. This feature is shown as a schematic drawing in FIG. 3, where it is simplified by the rectangle that almost completely surrounds this part. However, the measurement and control apparatus 15 and the photodiode 13, provided for the reflection of the ray of light reflected at the concave spherical surface 2, lie outside this structural unit.

What is claimed is:

1. A process for continuous determination of the optical layer thicknesses of coatings, which are applied on a convex spherical surface and on a concave spherical surface of a concave convex lens, the convex spherical surface having a radius $R_1$, and the concave spherical surface having a radius $R_2$, the process comprising the steps of:

beaming a ray of light eccentrically during the coating process at each surface of the concave convex lens;

continuously measuring the reflection or transmission at the convex spherical surface and at the concave spherical surface with photodiodes; and determining the optical layer thickness of the coating on the concave spherical surface based on the measured reflection or transmission at the concave spherical surface, and determining the optical layer thickness of the coating on the convex spherical surface based on the measured reflection or transmission at the convex spherical surface.

2. Process as claimed in claim 1, wherein a ray of light is beamed at the peripheral area of the concave convex lens.

3. Process as claimed in claim 1, wherein the ray of light is split with a chopper or guided through a narrow band filter prior to reaching the photodiodes.

4. Process as claimed in any one of the claim 1, wherein the ray of light is guided through a beam splitter prior to impinging on the concave convex lens, and the intensity of one part of the ray of light is determined with another photodiode.

5. Process as claimed in claim 4, wherein a ray of light is guided through a deflecting mirror that is used as a beam splitter.

6. Process as claimed in claim 1, wherein the white light is used as the ray of light.

7. Process as claimed in claim 1, wherein the ray of light is guided perpendicularly onto the convex spherical surface.

8. Process as claimed in claim 1, wherein a ray of light having a diameter ranging from 0.1 mm to 2 mm is used.

9. Process as claimed in claim 1, wherein eyeglass lenses are used as the concave convex lenses.

10. Process as claimed in claim 1, wherein the ray of light is guided via an adjustable mirror to a photodiode.

11. Process as claimed in claim 1, wherein the reflection or the transmission at the convex spherical surface or at the concave spherical surface is measured continuously with position sensitive detectors that are provided as the photodiodes.

12. Process as claimed in claim 1, wherein the change in direction of the ray of light reflected at the convex spherical surface is measured continuously and compensated for with a control system.

13. Process as claimed in claim 1, wherein the ray of light is emitted from a laser diode that is provided as the light source.

* * * * *